(12) United States Patent
Itadani (10) Patent No.: US 10,487,844 B2
(45) Date of Patent: Nov. 26, 2019

(54) MECHANICAL SEAL FOR ROTATING SHAFT

(71) Applicant: EAGLE INDUSTRY CO., LTD., Minato-ku, Tokyo (JP)

(72) Inventor: Masatoshi Itadani, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 360 days.

(21) Appl. No.: 15/544,830

(22) PCT Filed: Jan. 28, 2016

(86) PCT No.: PCT/JP2016/052415
§ 371 (c)(1),
(2) Date: Jul. 19, 2017

(87) PCT Pub. No.: WO2016/125665
PCT Pub. Date: Aug. 11, 2016

(65) Prior Publication Data
US 2018/0003187 A1    Jan. 4, 2018

(30) Foreign Application Priority Data

Feb. 5, 2015  (JP) ................................ 2015-021494

(51) Int. Cl.
F04D 29/12    (2006.01)
F04C 15/00    (2006.01)
(Continued)

(52) U.S. Cl.
CPC .......... *F04D 29/12* (2013.01); *F04C 15/0038* (2013.01); *F04C 27/009* (2013.01);
(Continued)

(58) Field of Classification Search
CPC ...................... F04C 15/0003–15/00038; F04C 27/00–27/009; F04D 29/08–29/128;
(Continued)

(56) References Cited

U.S. PATENT DOCUMENTS 4,605,235 A * 8/1986 Sundberg ............. F16J 15/3464
277/306
6,062,815 A * 5/2000 Holt ..................... F04D 29/0413
277/361
(Continued)

FOREIGN PATENT DOCUMENTS

JP    197786801 U    6/1977
JP    1983114897 U    8/1983
(Continued)

OTHER PUBLICATIONS

International Search Report (ISR) dated Apr. 12, 2016, issued for International application No. PCT/JP2016/052415.

*Primary Examiner* — Bryan M Lettman
(74) *Attorney, Agent, or Firm* — Law Office of Katsuhiro Arai (57) ABSTRACT

In a mechanical seal, a stationary-side seal ring (20) is disposed on the high-pressure fluid side of a rotating-side seal ring (21), and fixed to a housing (1) and has sliding surfaces (20a), (20c), and (20d) supporting a rotating shaft (2) in both a radial direction and a thrust direction. The rotating-side seal ring (21) is axially movably fitted by a bellows (25) fitted on the rotating shaft (2). The rotating shaft (2) has an outer peripheral surface (2a) contacting and sliding on the radial sliding surface (20a) of the stationary-side seal ring (20) to be supported radially. Thrust rings (10a) and (10b) are provided between the stationary-side seal ring (20) and the rotating shaft (2), for supporting the rotating shaft (2) in thrust directions. The mechanical seal (Continued)

can eliminate the need for an additional bearing and provide stable performance as a bearing.

19 Claims, 3 Drawing Sheets

(51) Int. Cl.
  *F04C 27/00* (2006.01)
  *F16J 15/34* (2006.01)
  *F04D 29/044* (2006.01)
(52) U.S. Cl.
  CPC ......... *F16J 15/3404* (2013.01); *F16J 15/344* (2013.01); *F16J 15/3408* (2013.01); *F16J 15/3412* (2013.01); *F16J 15/3472* (2013.01); *F04D 29/044* (2013.01)
(58) Field of Classification Search
  CPC ...... F04D 29/044; F16J 15/34; F16J 15/3404; F16J 15/3412–15/3432; F16J 15/3408
  See application file for complete search history.

(56) References Cited

U.S. PATENT DOCUMENTS

| | | | | |
|---|---|---|---|---|
| 6,113,106 A | * | 9/2000 | Dahlheimer | F16J 15/36 |
| | | | | 277/423 |
| 2013/0195649 A1 | * | 8/2013 | Kitano | F04D 17/12 |
| | | | | 415/229 |
| 2013/0209011 A1 | * | 8/2013 | Tokunaga | F16C 17/045 |
| | | | | 384/123 |
| 2016/0097293 A1 | * | 4/2016 | Svihla | F01D 11/02 |
| | | | | 277/424 |
| 2017/0321711 A1 | * | 11/2017 | Collins | E21B 43/128 |

FOREIGN PATENT DOCUMENTS

| | | |
|---|---|---|
| JP | 1984111994 U | 7/1984 |
| JP | 2005188393 A | 7/2005 |
| JP | 2005188651 A | 7/2005 |
| JP | 2005207310 A | 8/2005 |
| JP | 2006207513 A | 8/2006 |
| JP | 2013053693 A | 3/2013 |

* cited by examiner

MECHANICAL SEAL FOR ROTATING SHAFT

This application is the U.S. National Phase under 35 U.S.C. § 371 of International Application PCT/JP2016/052415, filed Jan. 28, 2016, which claims priority to Japanese Patent Application No. 2015-021494, filed Feb. 5, 2015. The International Application was published under PCT Article 21(2) in a language other than English.

TECHNICAL FIELD

The present invention relates to mechanical seals, and in particular, relates to mechanical seals suitable for small and inexpensive electric water pumps and the like, which have a fewer number of components and are small and inexpensive.

BACKGROUND ART

Conventional mechanically-driven water pumps typically have a structure that includes a mechanical seal and a lip seal, and supports a rotating shaft on a ball bearing (see Patent Documents 1 and 2, for example).

In hybrid vehicles and electric vehicles, electric pumps that allow more accurate thermal management than mechanical belt-driven ones have been used in recent years against a backdrop of fuel savings. It is expected that electric pumps will become used in water pumps for general automobiles in the future.

There are two types of electric pumps, a seal-less structure called a canned type (see Patent Document 3, for example), and a seal mechanism-equipped type like mechanical belt-driven water pumps (see Patent Documents 4 and 5, for example).

Since the canned type is seal-less, there is no fear of water leaks. On the other hand, the canned type has a structure in which a stator and a rotor are separated by a partition wall (a can 26 in Patent Document 3), and thus has problems of a great power loss and a very high cost when using a permanent magnet.

Figure 3:
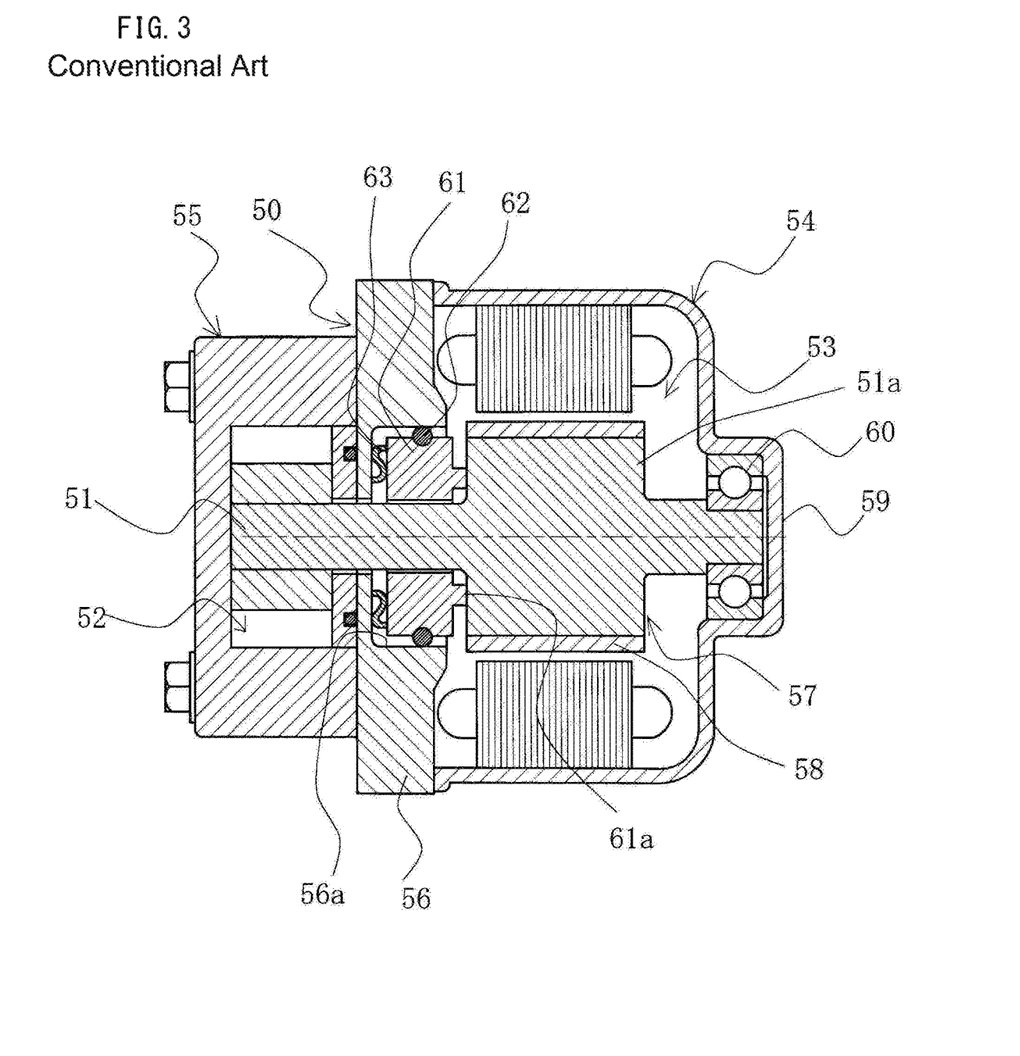
FIG. 3 is a diagram showing the conventional art.

By contrast, the seal mechanism-equipped type has a risk of water leaks since it uses a seal mechanism as shown in FIG. 3. However, the seal mechanism-equipped type has a small power loss between an induction coil (on the stator side) and a magnet (on the rotor side), can use a small-sized magnet, is lower in cost than the canned type, and may become widely used in the future.

CITATION LIST

Patent Document

Patent Document 1: JP 2013-53693 A
Patent Document 2: JP 2005-188651 A
Patent Document 3: JP 2006-207513 A
Patent Document 4: JP 2005-188393 A
Patent Document 5: JP 2005-207310 A

SUMMARY OF THE INVENTION

Problem to be Solved by the Invention

In a conventional art shown in FIG. 3, a pump section 52 is formed on one end side of a main shaft 51 disposed in a housing 50, and a motor section 53 on the other end side, a housing substrate 56 demarcating a motor housing 54 housing the motor section 53 and a pump housing 55 housing the pump section 52 is provided, the housing substrate 56 is formed with a through hole 56a through which the main shaft 51 is inserted, on the motor section 53 side of the main shaft 51, a large-diameter portion 51a supporting a magnet 58 is formed, and the large-diameter portion 51a and the magnet 58 form a rotor portion 57 of a motor, the main shaft 51 is rotatably supported by a ball bearing 60 disposed at a bottom portion 59 of the motor housing 54 and a bearing sleeve 61, and the sleeve 61 constitutes a sliding bearing supporting the rotation of the main shaft 51, and at the same time, is formed as a stationary-side seal ring of a mechanical seal axially sealing the through hole 56a of the housing substrate 56, is fitted in the inner periphery of the through hole 56a of the housing substrate 56 via an O-ring 62, and is pressed at a protruded portion 61a provided at its end portion by a washer 63 against the large-diameter portion 51a constituting the rotor portion 57. When the large-diameter portion 51a is worn by sliding, the main shaft 51 must be replaced since the large-diameter portion 51a of the main shaft 51 also serves as a rotating-side seal ring, which causes a problem that the replacement is not easy. Characteristics as a sliding material are required of the large-diameter portion 51a. However, when the entire main shaft 51 is formed from a material suitable for a sliding material, there is also a problem such as a cost increase.

Further, in this conventional art, the sleeve 61 serving as both the sliding bearing and the stationary-side seal ring is of the type configured to be axially movable (a structure with a pressing member resiliently urging a seal ring installed on the stationary side, a so-called "stationary type"). Therefore, it is required to set a large radial clearance on a bearing surface of the sleeve 61, causing another problem that there is a fear that the main shaft 51 rattles on the bearing surface, damaging the bearing surface. Further, it is necessary to additionally dispose a ball bearing 60. There are many points to be improved including a cost increase.

The present invention has been made to solve the problems of the conventional art, and has an object of providing a mechanical seal configured to allow a rotating shaft to be supported only by a stationary-side seal ring, thereby eliminating the need to provide an additional bearing, to enable a size reduction and a cost reduction, and to eliminate the need for the stationary-side seal ring to move axially, thereby allowing it to provide stable performance as a bearing.

Means for Solving Problem

In order to achieve the above object, a mechanical seal according to a first aspect of the present invention is a mechanical seal fitted in a shaft seal part formed between a housing and a rotating shaft, for sealing between the housing and the rotating shaft, including a stationary-side seal ring, a rotating-side seal ring facing and sliding on the stationary-side seal ring, the stationary-side seal ring being disposed on a high-pressure fluid side of the rotating-side seal ring and being fixed to the housing, and having a sliding surface supporting the rotating shaft in both a radial direction and a thrust direction, the rotating-side seal ring being fitted axially movably by an urging means fitted on the rotating shaft, the rotating shaft having an outer peripheral surface contacting and sliding on the radial sliding surface of the stationary-side seal ring to be supported radially, and a thrust ring provided between the stationary-side seal ring and the rotating shaft, for supporting the rotating shaft in a thrust direction.

According to this aspect, the rotating shaft can be supported only by the stationary-side seal ring, which eliminates the need to provide an additional bearing, and thus can contribute to a size reduction and a cost reduction of the device. Further, the stationary-side seal ring is fixed to the housing to eliminate the need for its axial movement, and thus can provide stable performance as a bearing.

According to a second aspect of the present invention, in the mechanical seal in the first aspect, the thrust ring is provided on the rotating shaft, and the stationary-side seal ring has a side surface provided with a sliding surface in a thrust direction that slides on the thrust ring.

According to this aspect, the area of the sliding surface of the thrust ring can be secured, and its mounting structure can be simplified.

According to a third aspect of the present invention, in the mechanical seal in the first or second aspect, the thrust ring is provided at least on a high-pressure fluid side of the stationary-side seal ring.

According to this aspect, at least the movement of the rotating shaft in the direction that separates the stationary-side seal ring and the rotating-side seal ring is inhibited, and thus the sealing function of the sealing faces of the stationary-side seal ring and the rotating-side seal ring can be prevented from being impaired. When the thrust ring is provided on either side of the stationary-side seal ring, the movement of the rotating shaft in the direction that brings the stationary-side seal ring and the rotating-side seal ring closer to each other is also inhibited, so that excessively close contact between the sealing faces of the stationary-side seal ring and the rotating-side seal ring is prevented, and the sealing faces can be prevented from being damaged.

According to a fourth aspect of the present invention, the mechanical seal in any one of the first to third aspects further includes, on at least one sliding surface of a sliding surface of the thrust ring provided on a high-pressure fluid side of the stationary-side seal ring and an opposing sliding surface relatively sliding on the sliding surface, a fluid introducing means for reducing friction between the sliding surfaces and introducing fluid into the radial sliding surfaces of the stationary-side seal ring and the rotating shaft.

According to this aspect, friction between the sliding surfaces of the stationary-side seal ring and the thrust ring provided on the high-pressure fluid side of the stationary-side seal ring, and between the radial sliding surfaces of the stationary-side seal ring and the rotating shaft can be reduced, which can contribute to the device's power savings, stability, and longer life.

According to a fifth aspect of the present invention, in the mechanical seal in the fourth aspect, the fluid introducing means includes at least one of a fluid circulation groove, a positive-pressure generation mechanism, and a spiral groove.

According to this aspect, fluid can be reliably introduced into the sliding surfaces, and friction between the sliding surfaces can be further reduced.

According to a sixth aspect of the present invention, the mechanical seal in any one of the first to fifth aspects has a structure in which the housing is a housing of an electric water pump, a motor device is disposed at one end in the housing, and a pump device driven by the motor device via the rotating shaft is disposed at the other end, the mechanical seal is disposed between the motor device and the pump device, the stationary-side seal ring is fixedly supported by the housing, the rotating shaft is supported by the stationary-side seal ring, and a rotor portion of the motor device, rotating blades of the pump device, and the rotating-side seal ring are supported by the rotating shaft.

According to this aspect, the electric water pump including the seal mechanism can reduce power loss between an induction coil (stator side) and a magnet (rotor side), and can use a small-sized magnet. Further, the rotating shaft can be supported only by the stationary-side seal ring, which eliminates the need to provide an additional bearing, so that the electric water pump can be reduced in size and cost.

Effect of the Invention

The present invention achieves outstanding effects as below.

(1) The rotating shaft can be supported only by the stationary-side seal ring, which eliminates the need to provide an additional bearing, and thus can contribute to a size reduction and a cost reduction of the device. Further, the stationary-side seal ring is fixed to the housing to eliminate the need for its axial movement, and thus can provide stable performance as a bearing.

(2) The thrust ring is provided on the rotating shaft, and the stationary-side seal ring has a side surface provided with a sliding surface in a thrust direction that slides on the thrust ring, so that the area of the sliding surface of the thrust ring can be secured, and its mounting structure can be simplified.

(3) The thrust ring is provided at least on the high-pressure fluid side of the stationary-side seal ring of the opposite sides of the stationary-side seal ring, thereby inhibiting the movement of the rotating shaft in the direction that separates the stationary-side seal ring and the rotating-side seal ring, so that the sealing function of the sealing faces of the stationary-side seal ring and the rotating-side seal ring can be prevented from being impaired. When the thrust ring is provided on either side of the stationary-side seal ring, the movement of the rotating shaft in the direction that brings the stationary-side seal ring and the rotating-side seal ring closer to each other is also inhibited, so that excessively close contact between the sealing faces of the stationary-side seal ring and the rotating-side seal ring is prevented, and the sealing faces can be prevented from being damaged.

(4) On at least one sliding surface of the sliding surface of the thrust ring provided on the high-pressure fluid side of the stationary-side seal ring and the opposing sliding surface relatively sliding on the sliding surface, a fluid introducing means for reducing friction between the sliding surfaces and introducing fluid into the radial sliding surfaces of the stationary-side seal ring and the rotating shaft is provided, so that friction between the sliding surfaces of the stationary-side seal ring and the thrust ring provided on the high-pressure fluid side of the stationary-side seal ring, and between the radial sliding surfaces of the stationary-side seal ring and the rotating shaft can be reduced, which can contribute to the device's power savings, stability, and longer life.

(5) By including at least one of a fluid circulation groove, a positive-pressure generation mechanism, and a spiral groove, the fluid introducing means can reliably introduce fluid into the sliding surfaces, and can further reduce friction between the sliding surfaces.

(6) By having a structure in which the housing is a housing of an electric water pump, a motor device is disposed at one end in the housing, and a pump device driven by the motor device via the rotating shaft at the other end, the mechanical seal is disposed between the motor device and the pump device, the stationary-side seal ring is fixedly supported by the housing, the rotating shaft is supported by the stationary-side seal ring, and a rotor portion of the motor device, rotating blades of the pump device, and the rotating-side seal ring are supported by the rotating shaft, the electric water pump including the seal mechanism can reduce power loss between an induction coil (stator side) and a magnet (rotor side), and can use a small-sized magnet. Further, the rotating shaft can be supported only by the stationary-side seal ring, which eliminates the need to provide an additional bearing, so that the electric water pump can be reduced in size and cost.

DESCRIPTION OF EMBODIMENT

Hereinafter with reference to the drawings, forms for implementing this invention will be described illustratively based on an embodiment. However, the dimensions, materials, shapes, relative arrangements, and the like of components described in the embodiment are not intended to limit the scope of the present invention only to them unless otherwise described explicitly.
First Embodiment With reference to FIGS. 1 and 2, a mechanical seal according to a first embodiment of the present invention will be described.

Figure 1:
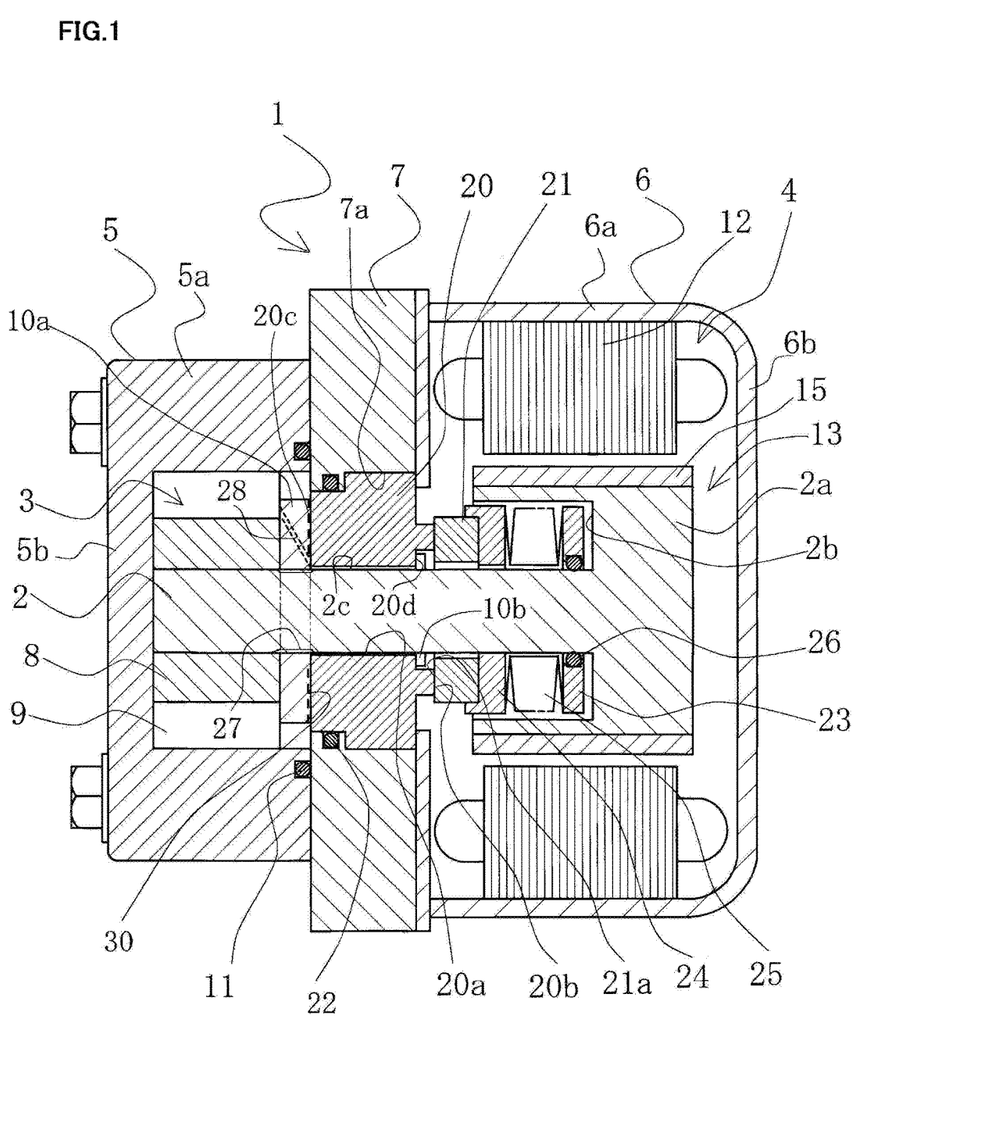
FIG. 1 is a vertical cross-sectional view showing a mechanical seal according to a first embodiment of the present invention.

The first embodiment shown in FIG. 1 illustrates a case where the mechanical seal according to the present invention is applied to a small electric water pump in which a pump chamber to force-feed liquid and an electric motor chamber under an air environment are disposed adjacently. The mechanical seal is an outside mechanical seal in the form of sealing sealed fluid on the high-pressure fluid side heading from the inner periphery toward the outer periphery of sealing faces to leak.

In FIG. 1, a pump device 3 is disposed on one end side (the left side in FIG. 1) of a rotating shaft 2 disposed in a housing 1, and a motor device 4 on the other end side (the right side in FIG. 1).

The housing 1 includes a pump housing 5 housing mainly the pump device 3, a motor housing 6 housing mainly the motor device 4, and a partition member 7 demarcating them.

In the pump device 3, the pump housing 5 includes a cylindrical portion 5a and a bottom portion 5b, and has a bottomed cup shape in cross section. The opening side abuts on one side surface of the partition member 7. Its interior housing space houses rotating blades 8, and forms a pump chamber 9. The rotating blades 8 are rotationally driven by the driving force of the motor device 4 via the rotating shaft 2 to force-feed liquid to a predetermined location. Further, an O-ring 11 is fitted between the pump housing 5 and the partition member 7 for sealing to prevent liquid from leaking from the pump chamber 9 to the outside.

In the motor device 4, the motor housing 6 includes a cylindrical portion 6a and a bottom portion 6b, and is formed in a bottomed cup shape opening at one side. The opening side abuts on a side surface of the partition member 7 opposite to the pump device 3. Its interior housing space houses a stator portion 12 and a rotor portion 13 that constitute a motor.

The rotating shaft 2 is rotatably supported by a stationary-side seal ring 20 disposed to also have a function as a bearing. This point will be described in detail below.

The rotating shaft 2 is formed with a large-diameter portion 2a supporting a magnet 15 on the motor device 4 side (the right side in FIG. 1). The large-diameter portion 2a and the magnet 15 constitute the rotor portion of the motor. The magnet 15 has an axial width approximately the same as that of the stator portion 12. The large-diameter portion 2a on which the magnet 15 is fitted also has an axial width on the outer diameter side approximately the same as that of the stator portion 12, and is formed with a housing space 2b for disposing a rotating-side seal ring 21 described below therein on the pump device 3 side on the inner diameter side.

The large-diameter portion 2a is not limited to a form integrated with the rotating shaft 2 as shown in FIG. 1, and may be in any form that supports the magnet 15 on the outer diameter side and transmits a driving force to the rotating shaft 2, and accommodates a seal ring and others on the inner diameter side. For example, the large-diameter portion 2a may be formed by a member separate from the rotating shaft 2.

The partition member 7 demarcates the pump housing 5 and the motor housing 6, holds them while supporting the rotating shaft 2 via the stationary-side seal ring 20, and has a predetermined thickness because of the necessity of having a certain strength. Therefore, a through hole 7a is formed in the radial center of the partition member 7 for fixing the stationary-side seal ring 20. The through hole 7a is configured to have a small-diameter portion and a large-diameter portion to be securely engaged with an outer peripheral surface of the stationary-side seal ring 20 both radially and axially, to be able to tightly hold the stationary-side seal ring 20. Further, a rotation-prevention mechanism not shown is formed between the partition member 7 and the stationary-side seal ring 20 to prevent the partition member 7 and the stationary-side seal ring 20 from rotating relatively. An O-ring 22 is provided in the partition member 7 to seal the through hole 7a and the outer peripheral surface of the stationary-side seal ring 20.

With regard to the holding of the stationary-side seal ring 20, the stationary-side seal ring 20 may be provided to the partition member 7 via an elastic body filling the entire-surface clearance between the stationary-side seal ring 20 and the partition member 7, or a member that facilitates its installment to the partition member 7.

The stationary-side seal ring 20 formed to also perform the function of a sliding bearing is disposed between the partition member 7 and the rotating shaft 2. The stationary-side seal ring 20 has a mechanical strength, and also has characteristics including self-lubrication and wear resistance. For example, the stationary-side seal ring 20 is formed from a material selected from among carbon, SiC, cemented carbide, and the like. A sliding bearing portion for rotatably supporting the rotating shaft is formed on an inner peripheral surface 20a of the stationary-side seal ring 20. The clearance between the sliding bearing portion on the inner peripheral surface 20a of the stationary-side seal ring 20 and the rotating shaft outer periphery is determined by taking operating temperature, material, or the like into consideration, and is determined according to clearances set in common sliding bearings.

The rotating-side seal ring 21 facing and sliding on a sealing face 20b of the stationary-side seal ring 20 is disposed on the side opposite to the pump device 3 side (sealed fluid side) of the stationary-side seal ring 20. Like the stationary-side seal ring 20, the rotating-side seal ring 21 has a mechanical strength, and also has characteristics including self-lubrication and wear resistance. For example, the rotating-side seal ring 21 is selected from among carbon, SiC, cemented carbide, and the like by taking conformability to the opposing member or the like into consideration.

An urging means 25 for axially urging the rotating-side seal ring 21 toward the stationary-side seal ring 20 side is fitted on the rotating shaft 2, so that a sealing face 21a of the rotating-side seal ring 21 is pressed against the sealing face 20b of the stationary-side seal ring 20.

In this embodiment, the urging means 25 is formed from a bellows. One end of the bellows 25 is joined to a collar 23, and the other end is joined to a retainer 24. The rotating-side seal ring 21 is shrink-fitted or press-fitted in an end face of the retainer 24.

The urging means is not limited to the bellows, and a coil spring may alternatively be used as a matter of course.

The collar 23 is formed from metal in a ring shape, and is fixed on an outer peripheral surface of the rotating shaft 2 via an O-ring 26.

The bellows 25 is formed in an accordion tubular shape in its entirety by aligning a plurality of metal diaphragm plates formed in a corrugated annular shape by blanking or the like, and joining outer diameter portions and inner diameter portions of adjacent diaphragm plates alternately by gas welding or the like. One end thereof is integrally joined to the collar 23 side by gas welding or the like.

The retainer 24 is formed from metal in a tubular shape. The other end of the bellows 25 is integrally joined to the retainer 24 by gas welding or the like. The material of the retainer 24 is the same as that of the bellows 25, or includes a different kind of material having a thermal expansion coefficient approximating to that of the bellows 25 material.

The retainer 24, the bellows 25, and the collar 23 are typically produced as one body by welding.

In this embodiment, the rotating-side seal ring 21, the bellows 25 constituting the urging means, the collar 23, and the retainer 24 are disposed in the housing space 2b formed in the large-diameter portion 2a of the rotating shaft 2, in consideration of reducing the axial dimension of the electric water pump.

The rotating shaft 2 is provided, in addition to an outer peripheral surface 2c contacting and sliding on the inner peripheral surface 20a constituting a radial sliding surface of the stationary-side seal ring 20 to be supported radially, with a thrust ring 10a on the pump device side and a thrust ring 10b on the motor device side that contact and slide on opposite side surfaces 20c and 20d constituting sliding surfaces in thrust directions of the stationary-side seal ring 20, to support load in the thrust directions. The opposite side surfaces 20c and 20d of the stationary-side seal ring 20 contacting and sliding on the thrust rings 10a and 10b constitute thrust sliding surfaces.

The thrust rings 10a and 10b are securely fixed on the rotating shaft 2 by being integrally formed with the rotating shaft 2, being fastened into the rotating shaft 2 via holes of the thrust rings 10a and 10b and screw portions formed on the surface of the rotating shaft 2, being fitted into the rotating shaft 2 by interference fit, being pressed by the rotating blades 8 into steps formed in the rotating shaft 2, or other means.

In FIG. 1, the thrust ring 10a on the pump device side is fastened and fixed into the rotating shaft 2 via a screw portion 27, and the thrust ring 10b on the motor device side is fixed to the rotating shaft 2 by interference fit.

The thrust rings may alternatively be provided at the stationary-side seal ring 20. In that case, the rotating shaft 2 is provided with steps to be engaged with the thrust rings.

The thrust ring 10a contacting and sliding on the side surface 20c of the stationary-side seal ring 20 on the pump device 3 side is for preventing the rotating shaft 2 from moving toward the motor device 4 side, separating the sealing faces of the stationary-side seal ring 20 and the rotating-side seal ring 21, and causing leakage.

On the other hand, the thrust ring 10b contacting and sliding on the side surface 20d of the stationary-side seal ring 20 on the motor device 4 side is for preventing the rotating shaft 2 from moving toward the pump device 3 side, bringing the sealing faces of the stationary-side seal ring and the rotating-side seal ring 21 into excessively close contact, and damaging the sealing faces.

Thus, the thrust ring 10a is indispensable, but the thrust ring 10b may be provided as needed.

At least one sliding surface of a sliding surface of the thrust ring 10a provided on the high-pressure fluid side of the stationary-side seal ring 20 and the sliding surface 20c of the stationary-side seal ring 20 in the thrust direction relatively sliding on the sliding surface is provided with a fluid introducing means 30 for reducing friction between the sliding surfaces and introducing fluid into the radial sliding surfaces 20a and 2C of the stationary-side seal ring 20 and the rotating shaft 2.

In addition to the fluid introducing means 30, a fluid introduction hole 28 shown in broken lines in the thrust ring 10a may be provided to introduce fluid into the radial sliding surface 20a of the stationary-side seal ring 20.

Figure 2:
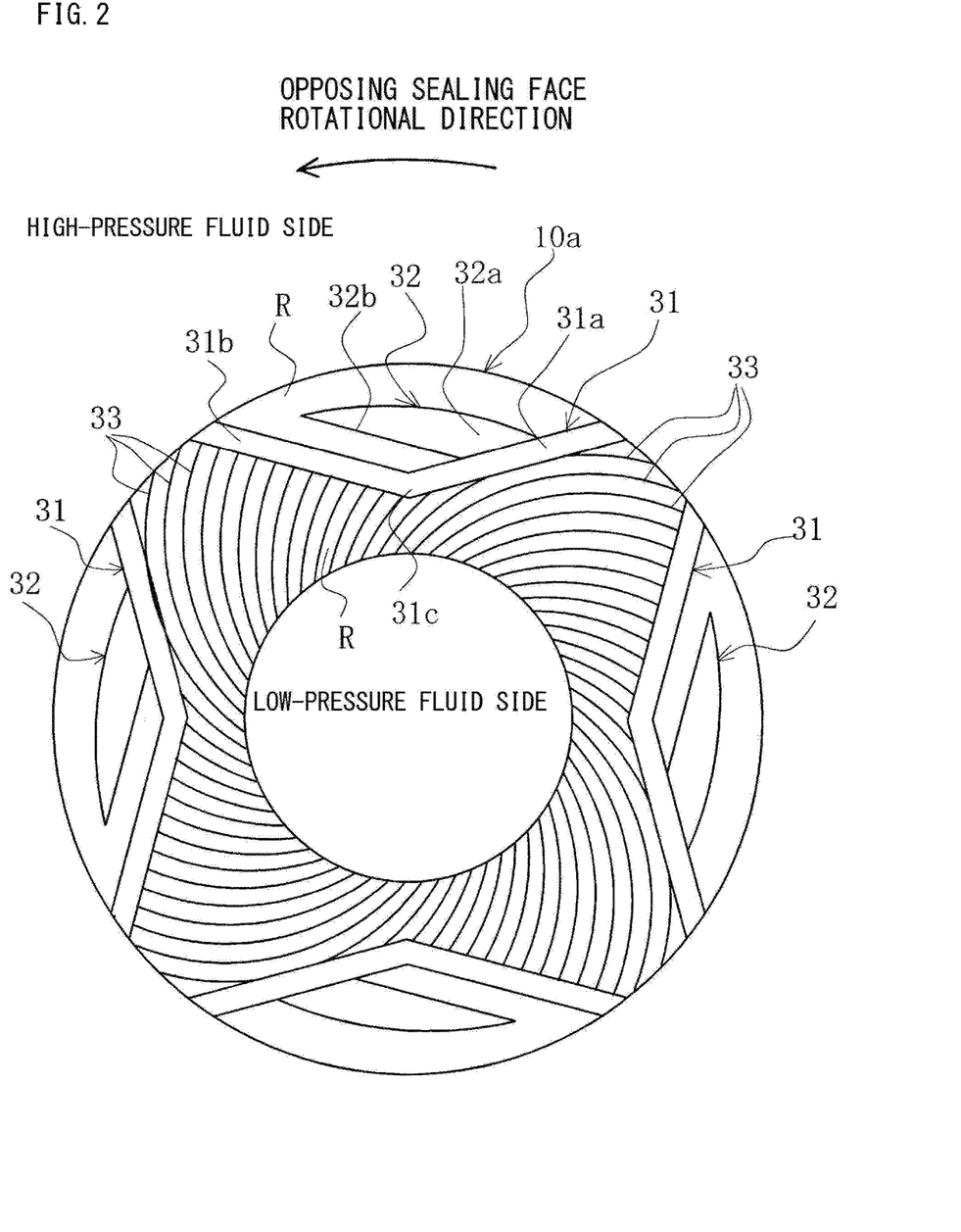
FIG. 2 is a diagram showing a liquid introducing means provided on a sliding surface of a thrust ring.

FIG. 2 shows the sliding surface of the thrust ring 10a in the thrust direction. The fluid introducing means 30 is provided on the sliding surface.

In FIG. 2, assume that the outer peripheral side of the sliding surface of the thrust ring 10a is the high-pressure fluid side, the inner peripheral side is the low-pressure fluid side, and the opposing sliding surface rotates in a counterclockwise direction.

On the sliding surface of the thrust ring 10a, four fluid circulation grooves 31 communicating with the high-pressure fluid side and isolated from the low-pressure fluid side by smooth portions R of the sliding surface (sometimes referred to as "land portions" in the present invention) are evenly spaced circumferentially.

The fluid circulation grooves 31 each include an inlet portion 31a for entry from the high-pressure fluid side, an outlet portion 31b for exit to the high-pressure fluid side, and a connection portion 31c circumferentially connecting the inlet portion 31a and the outlet portion 31b, and are isolated from the low-pressure fluid side by the land portions R. The fluid circulation grooves 31 have the function of actively introducing sealed fluid from the high-pressure fluid side onto the sliding surface and discharging it in order to prevent fluid containing corrosion products or the like from being concentrated on the sliding surface. The fluid circulation grooves 31 are formed with the inlet portions 31a and the outlet portions 31b to facilitate introducing sealed fluid onto the sliding surface and discharging it in accordance with the rotation direction of the opposing sliding surface, and on the other hand, are isolated from the low-pressure fluid side by the land portions R to reduce leakage.

On the sliding surface provided with the fluid circulation grooves 31, positive-pressure generation mechanisms 32 including positive-pressure generation grooves 32a shallower than the fluid circulation grooves 31 are provided in portions enclosed by the fluid circulation grooves 31 and the high-pressure fluid side. The positive-pressure generation mechanisms 32 generate positive pressure (dynamic pressure), thereby increasing a fluid film between the sliding surfaces and improving the lubrication performance.

The positive-pressure generation grooves 32a communicate with the inlet portions 31a of the fluid circulation grooves 31, and are isolated from the outlet portions 31b and the high-pressure fluid side by the land portions R.

In this embodiment, the positive-pressure generation mechanisms 32 are formed from Rayleigh step mechanisms including the positive-pressure generation grooves 32a communicating with the inlet portions 31a of the fluid circulation grooves 31 and Rayleigh steps 32b, but are not limited to this, for example, they may be formed by femto-grooves with dams. It is essential only that they are mechanisms that generate positive pressure.

A plurality of spiral grooves 33 is provided circumferentially in a portion except the fluid circulation grooves 31 and the positive-pressure generation grooves 32a on the sliding surface of the thrust ring 10a. The spiral grooves 33 actively introduce fluid from the high-pressure fluid side to the low-pressure fluid side by relative sliding on the opposing sliding surface. The introduced fluid is fed between the inner peripheral surface 20a of the stationary-side seal ring 20 and the outer peripheral surface 2c of the rotating shaft 2.

When the electric water pump configured as described above is operated, the rotating blades 8 of the pump device 3 are rotationally driven by the driving force of the motor device 4 via the rotating shaft 2 to force-feed liquid to a predetermined location. At that time, high-pressure liquid in the pump chamber 9 passes between the sliding surface of the thrust ring 10a provided on the high-pressure fluid side of the stationary-side seal ring 20 and the sliding surface 20c of the stationary-side seal ring 20 in the thrust direction, or through the fluid introduction hole 28, and enters a radial sliding bearing portion between the inner periphery surface 20a of the stationary-side seal ring 20 and the outer peripheral surface 2c of the rotating shaft 2. The liquid entering the radial sliding bearing portion passes between the thrust sliding surface 20d of the stationary-side seal ring 20 on the motor device 4 side and the thrust ring 10b, and reaches near a sealing portion formed by the sealing face 20b of the stationary-side seal ring 20 and the sealing face 21a of the rotating-side seal ring 21. However, the liquid is sealed by the sealing portion, and thus does not leak to the outer diameter side from the sealing portion. Further, since the collar 23 is fixed on the outer peripheral surface of the rotating shaft 2 via the O-ring 26, the liquid is also prevented from leaking outward from the inner diameter side of the rotating-side seal ring 21, the retainer 24, the bellows 25, and the collar 23.

When the fluid introducing means 30 continues to feed fluid into the thrust ring 10a from the pump device 3 side to the radial sliding bearing portion side, there is a fear that pressure on the radial sliding bearing portion side becomes high, causing the liquid to leak. Therefore, a connecting means for connecting the pump chamber 9 and the radial sliding bearing portion side may be provided. For example, as the connecting means, a through hole may be provided in the stationary-side seal ring 20.

Thus, high-pressure liquid in the pump chamber 9 is not leaked to the motor device 4 side.

Even when an operation of the electric water pump causes a thrust force toward the motor device 4 side to act on the rotating shaft 2, for example, the rotating shaft 2 is not moved to the motor device 4 side because the stationary-side seal ring 20 is firmly fixed to the partition member 7 of the housing 1, and the thrust sliding surface 20c of the stationary-side seal ring 20 on the pump device 3 side contacts and slides on the thrust ring 10a fixed on the rotating shaft 2. This inhibits the movement of the rotating shaft 2 in the direction that separates the stationary-side seal ring 20 and the rotating-side seal ring 21, and can prevent the sealing function of the sealing faces of the stationary-side seal ring 20 and the rotating-side seal ring 21 from being impaired.

Conversely, even when the vicinity of the rotating blades 8 of the pump device 3 is under a negative pressure, causing a thrust force toward the pump device 3 side to act on the rotating shaft 2, the rotating shaft 2 is not moved to the pump device 3 side because the stationary-side seal ring 20 is firmly fixed to the partition member 7 of the housing 1, and the thrust sliding surface 20d of the stationary-side seal ring 20 on the motor device 4 side contacts and slides on the thrust ring 10b fixed on the rotating shaft 2. This prevents excessively close contact between the sealing faces of the stationary-side seal ring 20 and the rotating-side seal ring 21, and can prevent the sealing faces from being damaged.

The above-described first embodiment achieves effects as below.

(1) The rotating shaft 2 can be supported only by the stationary-side seal ring 20, which eliminates the need to provide an additional bearing, and thus can contribute to a size reduction and a cost reduction of the device. Further, the stationary-side seal ring 20 is fixed to the partition member 7 of the housing 1 to eliminate the need for its axial movement, and thus can provide stable performance as a bearing.

(2) The thrust rings 10a and 10b are provided on the rotating shaft 2, and the side surfaces 20c and 20d of the stationary-side seal ring 20 are provided with the sliding surfaces in the thrust directions that slide on the thrust rings 10a and 10b, so that the sliding surfaces of the thrust rings 10a and 10b can have areas, and their mounting structures can be simplified.

(3) A sliding surface of the stationary-side seal ring 20 in a thrust direction and a thrust ring on the rotating shaft 2 are provided at least on the high-pressure fluid side of the opposite sides of the stationary-side seal ring 20, thereby inhibiting at least the movement of the rotating shaft 2 in the direction that separates the stationary-side seal ring 20 and the rotating-side seal ring 21, so that the sealing function of the sealing faces of the stationary-side seal ring 20 and the rotating-side seal ring 21 can be prevented from being impaired. When the thrust rings 10a and 10b are provided on the opposite sides of the stationary-side seal ring 20, the movement of the rotating shaft 2 in the direction that brings the stationary-side seal ring 20 and the rotating-side seal ring 21 closer to each other is also inhibited, and thus excessively close contact between the sealing faces of the stationary-side seal ring 20 and the rotating-side seal ring 21 is prevented, and the sealing faces can be prevented from being damaged.

(4) On at least one sliding surface of the sliding surface of the thrust ring 10a provided on the high-pressure fluid side of the stationary-side seal ring 20 and the sliding surface of the stationary-side seal ring 20 relatively sliding on the sliding surface, the fluid introducing means 30 for reducing friction between the sliding surfaces and introducing fluid into the radial sliding surfaces of the stationary-side seal ring 20 and the rotating shaft 2 is provided, so that friction between the sliding surfaces of the stationary-side seal ring 20 and the thrust ring 10a provided on the high-pressure fluid side of the stationary-side seal ring 20, and between the radial sliding surfaces of the stationary-side seal ring 20 and the rotating shaft 2 can be reduced, which can contribute to the device's power savings, stability, and longer life.

(5) By including at least either the fluid circulation grooves 31, the positive-pressure generation mechanisms 32, or the spiral grooves 33, the fluid introducing means 30 can reliably introduce fluid into the sliding surfaces, and can further reduce friction between the sliding surfaces.

(6) By having a structure in which the housing 1 is the housing of the electric water pump, the motor device 4 is disposed at one end in the housing 1, and the pump device 3 driven by the motor device 4 via the rotating shaft 2 at the other end, the mechanical seal is disposed between the motor device 4 and the pump device 3, the stationary-side seal ring 20 is fixedly supported by the housing 1, the rotating shaft 2 is supported by the stationary-side seal ring 20, and the rotor portion 13 of the motor device 4, the rotating blades 8 of the pump device 3, and the rotating-side seal ring 21 are supported by the rotating shaft 2, the electric water pump including the seal mechanism can reduce power loss between the stator portion 12 side and the rotor portion 13, and can use a small-sized magnet. Further, the rotating shaft 2 can be supported only by the stationary-side seal ring 20, which eliminates the need to provide an additional bearing, so that the electric water pump can be reduced in size and cost.

Although the embodiment of the present invention has been described above with reference to the drawings, its specific configuration is not limited to the embodiment. Any change and addition made without departing from the scope of the present invention are included in the present invention.

For example, in the case described in the above embodiment, the mechanical seal according to the present invention is applied to the electric water pump, but is not limited to this, and can be applied to any type including a seal mechanism such as a mechanical belt-driven water pump, for example.

Further, for example, in the case described in the above embodiment, the thrust rings 10a and 10b contact and slide on the opposite side surfaces 20c and 20d of the stationary-side seal ring 20, sliding surfaces in the thrust directions, which is not limiting. At least one thrust ring may be configured to contact and slide on the pump device 3 side of the stationary-side seal ring 20.

Further, for example, in the case described in the above embodiment, the thrust rings 10a and 10b are provided on the rotating shaft 2 side, but are not limited to this, and may alternatively be provided on the stationary-side seal ring 20 side. In that case, steps or the like to be engaged with the thrust rings 10a and 10b are provided on the rotating shaft 2 side.

Further, for example, in the case described in the above embodiment, the thrust ring 10a of the stationary-side seal ring 20 on the pump device 3 side is provided separately from the rotating blades 8, but is not limited to this. The rotating blades 8 may be integrated with the thrust ring 10a. In that case, the rotating blades 8 are provided such that the surface of the rotating blades 8 on the stationary-side seal ring 20 side slides on the thrust sliding surface 20c of the stationary-side seal ring 20.

Further, for example, in the above embodiment, the thrust ring 10b of the stationary-side seal ring 20 on the motor device 4 side is directly provided on the rotating shaft 2, but is not limited to this. The rotating shaft may be separated between the pump device 3 side and the motor device 4 side, a sleeve to be fitted on the outside diameter of the rotating shaft on the pump device 3 side may be provided on the motor device 4 side, and the sleeve may be integrated with the thrust ring 10b.

REFERENCE SIGN LIST

1 Housing
2 Rotating shaft
2a Large-diameter portion
2b Housing space
2c Outer peripheral surface supported radially
3 Pump device
4 Motor device
5 Pump housing
6 Motor housing
7 Partition member
7a Through hole
8 Rotating blade
9 Pump chamber
10a Thrust ring
10b Thrust ring
11 O-ring
12 Stator portion
13 Rotor portion
15 Magnet
20 Stationary-side seal ring
20a Inner peripheral surface
20b Sealing face
20c Side surface constituting a sliding surface
20d Side surface constituting a sliding surface
21 Rotating-side seal ring
21a Sealing face
22 O-ring
23 Collar
24 Retainer
25 Urging means
26 O-ring
27 Screw portion
28 Fluid introduction hole
30 Fluid introducing means
31 Fluid circulation groove
32 Positive-pressure generation mechanism
33 Spiral groove
R Land portion

The invention claimed is:

1. A mechanical seal fitted in a seal cavity formed between a housing and a rotating shaft, for sealing between the housing and the rotating shaft, the mechanical seal comprising:
   a stationary-side seal ring;
   a rotating-side seal ring facing and sliding on the stationary-side seal ring,
   the stationary-side seal ring being disposed on a high-pressure fluid side of the rotating-side seal ring, and being fixed to the housing and having a sliding surface radially supporting the rotating shaft,
   the rotating-side seal ring being fitted axially movably by an urging means fitted on the rotating shaft,
   the rotating shaft having an outer peripheral surface contacting and sliding on the radial sliding surface of the stationary-side seal ring to be supported radially; and
   a thrust ring provided between the stationary-side seal ring and the rotating shaft, for supporting the rotating shaft in a thrust direction.

2. The mechanical seal according to claim 1, wherein the thrust ring is provided on the rotating shaft, and the stationary-side seal ring has a side surface provided with a sliding surface in a thrust direction that slides on the thrust ring.

3. The mechanical seal according to claim 2, wherein the thrust ring is provided at least on a high-pressure fluid side of the stationary-side seal ring.

4. The mechanical seal according to claim 3, further comprising, on at least one sliding surface of a sliding surface of the thrust ring provided on a high-pressure fluid side of the stationary-side seal ring and an opposing sliding surface relatively sliding on the sliding surface, a fluid introducing means for reducing friction between the sliding surfaces and introducing fluid into the radial sliding surfaces of the stationary-side seal ring and the rotating shaft.

5. The mechanical seal according to claim 4, having a structure in which the housing is a housing of an electric water pump, a motor device is disposed at one end in the housing, and a pump device driven by the motor device via the rotating shaft at the other end, the mechanical seal is disposed between the motor device and the pump device, the stationary-side seal ring is fixedly supported by the housing, the rotating shaft is supported by the stationary-side seal ring, and a rotor portion of the motor device, rotating blades of the pump device, and the rotating-side seal ring are supported by the rotating shaft.

6. The mechanical seal according to claim 3, having a structure in which the housing is a housing of an electric water pump, a motor device is disposed at one end in the housing, and a pump device driven by the motor device via the rotating shaft at the other end, the mechanical seal is disposed between the motor device and the pump device, the stationary-side seal ring is fixedly supported by the housing, the rotating shaft is supported by the stationary-side seal ring, and a rotor portion of the motor device, rotating blades of the pump device, and the rotating-side seal ring are supported by the rotating shaft.

7. The mechanical seal according to claim 2, further comprising, on at least one sliding surface of a sliding surface of the thrust ring provided on a high-pressure fluid side of the stationary-side seal ring and an opposing sliding surface relatively sliding on the sliding surface, a fluid introducing means for reducing friction between the sliding surfaces and introducing fluid into the radial sliding surfaces of the stationary-side seal ring and the rotating shaft.

8. The mechanical seal according to claim 7, having a structure in which the housing is a housing of an electric water pump, a motor device is disposed at one end in the housing, and a pump device driven by the motor device via the rotating shaft at the other end, the mechanical seal is disposed between the motor device and the pump device, the stationary-side seal ring is fixedly supported by the housing, the rotating shaft is supported by the stationary-side seal ring, and a rotor portion of the motor device, rotating blades of the pump device, and the rotating-side seal ring are supported by the rotating shaft.

9. The mechanical seal according to claim 2, having a structure in which the housing is a housing of an electric water pump, a motor device is disposed at one end in the housing, and a pump device driven by the motor device via the rotating shaft at the other end, the mechanical seal is disposed between the motor device and the pump device, the stationary-side seal ring is fixedly supported by the housing, the rotating shaft is supported by the stationary-side seal ring, and a rotor portion of the motor device, rotating blades of the pump device, and the rotating-side seal ring are supported by the rotating shaft.

10. The mechanical seal according to claim 1, wherein the thrust ring is provided at least on a high-pressure fluid side of the stationary-side seal ring.

11. The mechanical seal according to claim 10, further comprising, on at least one sliding surface of a sliding surface of the thrust ring provided on a high-pressure fluid side of the stationary-side seal ring and an opposing sliding surface relatively sliding on the sliding surface, a fluid introducing means for reducing friction between the sliding surfaces and introducing fluid into the radial sliding surfaces of the stationary-side seal ring and the rotating shaft.

12. The mechanical seal according to claim 11, having a structure in which the housing is a housing of an electric water pump, a motor device is disposed at one end in the housing, and a pump device driven by the motor device via the rotating shaft at the other end, the mechanical seal is disposed between the motor device and the pump device, the stationary-side seal ring is fixedly supported by the housing, the rotating shaft is supported by the stationary-side seal ring, and a rotor portion of the motor device, rotating blades of the pump device, and the rotating-side seal ring are supported by the rotating shaft.

13. The mechanical seal according to claim 10, having a structure in which the housing is a housing of an electric water pump, a motor device is disposed at one end in the housing, and a pump device driven by the motor device via the rotating shaft at the other end, the mechanical seal is disposed between the motor device and the pump device, the stationary-side seal ring is fixedly supported by the housing, the rotating shaft is supported by the stationary-side seal ring, and a rotor portion of the motor device, rotating blades of the pump device, and the rotating-side seal ring are supported by the rotating shaft.

14. The mechanical seal according to claim 1, further comprising, on at least one sliding surface of a sliding surface of the thrust ring provided on a high-pressure fluid side of the stationary-side seal ring and an opposing sliding surface relatively sliding on the sliding surface, a fluid introducing means for reducing friction between the sliding surfaces and introducing fluid into the radial sliding surfaces of the stationary-side seal ring and the rotating shaft.

15. The mechanical seal according to claim 14, wherein the fluid introducing means includes at least one of a fluid circulation groove, a positive-pressure generation mechanism, and a spiral groove.

16. The mechanical seal according to claim 15, having a structure in which the housing is a housing of an electric water pump, a motor device is disposed at one end in the housing, and a pump device driven by the motor device via the rotating shaft at the other end, the mechanical seal is disposed between the motor device and the pump device, the stationary-side seal ring is fixedly supported by the housing, the rotating shaft is supported by the stationary-side seal ring, and a rotor portion of the motor device, rotating blades of the pump device, and the rotating-side seal ring are supported by the rotating shaft.

17. The mechanical seal according to claim 14, having a structure in which the housing is a housing of an electric water pump, a motor device is disposed at one end in the housing, and a pump device driven by the motor device via the rotating shaft at the other end, the mechanical seal is disposed between the motor device and the pump device, the stationary-side seal ring is fixedly supported by the housing, the rotating shaft is supported by the stationary-side seal ring, and a rotor portion of the motor device, rotating blades of the pump device, and the rotating-side seal ring are supported by the rotating shaft.

18. The mechanical seal according to claim 1, having a structure in which the housing is a housing of an electric water pump, a motor device is disposed at one end in the housing, and a pump device driven by the motor device via the rotating shaft at the other end, the mechanical seal is disposed between the motor device and the pump device, the stationary-side seal ring is fixedly supported by the housing, the rotating shaft is supported by the stationary-side seal ring, and a rotor portion of the motor device, rotating blades of the pump device, and the rotating-side seal ring are supported by the rotating shaft.

19. The mechanical seal according to claim 18, having a structure in which the housing is a housing of an electric water pump, a motor device is disposed at one end in the housing, and a pump device driven by the motor device via the rotating shaft at the other end, the mechanical seal is disposed between the motor device and the pump device, the stationary-side seal ring is fixedly supported by the housing, the rotating shaft is supported by the stationary-side seal ring, and a rotor portion of the motor device, rotating blades of the pump device, and the rotating-side seal ring are supported by the rotating shaft.

* * * * *